(12) United States Patent
Bessy et al.

(10) Patent No.: US 11,371,435 B2
(45) Date of Patent: Jun. 28, 2022

(54) DEVICE FOR CENTRING AND ROTATIONALLY GUIDING A TURBOMACHINE SHAFT COMPRISING MEANS FOR AN AXIAL RETENTION OF OUTER RING OF A BEARING

(71) Applicant: SAFRAN AIRCRAFT ENGINES, Paris (FR)

(72) Inventors: Arnaud Bessy, Moissy-Cramayel (FR); Laurent Leeder, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 313 days.

(21) Appl. No.: 16/608,018

(22) PCT Filed: May 17, 2018

(86) PCT No.: PCT/FR2018/051192
§ 371 (c)(1),
(2) Date: Oct. 24, 2019

(87) PCT Pub. No.: WO2018/211224
PCT Pub. Date: Nov. 22, 2018

(65) Prior Publication Data
US 2021/0062718 A1 Mar. 4, 2021

(30) Foreign Application Priority Data
May 18, 2017 (FR) ........................................ 1754412

(51) Int. Cl.
*F16C 23/08* (2006.01)
*F16C 27/06* (2006.01)
(Continued)

(52) U.S. Cl.
CPC .............. *F02C 7/06* (2013.01); *F01D 25/164* (2013.01); *F16C 23/08* (2013.01); *F16C 27/066* (2013.01);
(Continued)

(58) Field of Classification Search
CPC ...... F16C 23/08; F16C 27/045; F16C 27/066; F16C 2360/23; F01D 25/16; F01D 25/162; F01D 25/164
See application file for complete search history.

(56) References Cited

U.S. PATENT DOCUMENTS 6,443,698 B1 * 9/2002 Corattiyil ................ F01D 25/16
384/581
9,341,079 B2 * 5/2016 Antunes ................ F01D 25/164
(Continued)

FOREIGN PATENT DOCUMENTS

| EA | WO 2015/079156 A1 | 6/2015 |
| EP | 1 630 357 A2 | 3/2006 |
| FR | 2 960 907 A1 | 12/2011 |

OTHER PUBLICATIONS

International Search Report dated Jul. 19, 2018 in PCT/FR2018/051192 filed May 17, 2018.
(Continued)

*Primary Examiner* — James Pilkington
(74) *Attorney, Agent, or Firm* — Oblon, McClelland, Maier & Neustadt, L.L.P.

(57) ABSTRACT

A device for centring and rotationally guiding a turbomachine shaft, including a rolling bearing including an outer ring, a bearing mount, a band interposed between the outer ring and the bearing mount and a device for connecting the outer ring to the bearing mount, including a device for the axial retention of the outer ring including an axial thrust flange downstream of and in contact with the fixing flange of the connecting device, and including a fixing hole for
(Continued)

fixing together the fixing flange, the bearing mount and the axial thrust flange, which latter further includes a lug extending between two successive tabs of the elastically deformable device.

10 Claims, 5 Drawing Sheets

(51) Int. Cl.
    *F16C 27/04*     (2006.01)
    *F02C 7/06*     (2006.01)
    *F01D 25/16*     (2006.01)

(52) U.S. Cl.
    CPC .... *F05D 2220/323* (2013.01); *F05D 2230/64* (2013.01); *F05D 2240/54* (2013.01); *F05D 2260/30* (2013.01); *F16C 27/045* (2013.01)

(56) References Cited

U.S. PATENT DOCUMENTS

| | | | |
|---|---|---|---|
| 9,708,931 B2* | 7/2017 | Servant | F01D 25/164 |
| 10,030,582 B2* | 7/2018 | Zacchera | F02C 7/12 |
| 2006/0045404 A1 | 3/2006 | Allmon et al. | |
| 2013/0156574 A1 | 6/2013 | Antunes et al. | |
| 2016/0290161 A1 | 10/2016 | Servant et al. | |

OTHER PUBLICATIONS

French Preliminary Search Report dated Jan. 22, 2018 in Patent Application No. 1754412 filed May 18, 2017.

* cited by examiner

DEVICE FOR CENTRING AND ROTATIONALLY GUIDING A TURBOMACHINE SHAFT COMPRISING MEANS FOR AN AXIAL RETENTION OF OUTER RING OF A BEARING

TECHNICAL FIELD

The present invention relates to the field of turbomachines, and more particularly relates to a device for centring and rotatably guiding a shaft of a turbomachine, comprising a bearing of the type commonly called "flexible ring bearing". In a bearing of this type, the means for connecting the outer ring of the bearing to the bearing support comprise a fastening clamp mounted to the bearing support and elastically deformable means linking the outer ring of the bearing to the fastening clamp. The invention is in particular applicable to bearings dampened by means of an oil film, also called "squeeze film".

The invention is applicable to any type of terrestrial or aeronautic turbomachines, and in particular to aircraft turbomachines such as turbojet engines and turboprop engines. More preferentially, the invention is applicable to a dual flow twin spool turbofan engine.

BACKGROUND

In a turbomachine, the occurrence of an event such as the loss of a fan vane or a bearing drag by oil starvation causes very high loads on the bearings of the turbomachine.

Such loads can cause a rupture in the elastically deformable means connecting the outer ring of a "flexible" type bearing to the clamp ensuring fastening of the bearing to the bearing support. These elastically deformable means generally consist of a part commonly called "flexible cage" or "squirrel cage".

Upon rupturing, the elastically deformable means does not keep the bearing in place, whether axially or tangentially. If appropriate means are not provided, the rolling function is no longer ensured, which causes a quick degradation of the bearing and the surrounding parts. The bearing thereby can no longer ensure engine operation, in particular in "windmilling" phase.

To allow axial retention of the outer ring of the bearing to be ensured with respect to the bearing support even when the elastically deformable means which connect the outer ring of the bearing to the bearing support are ruptured, different solutions have been suggested.

Figure 1:
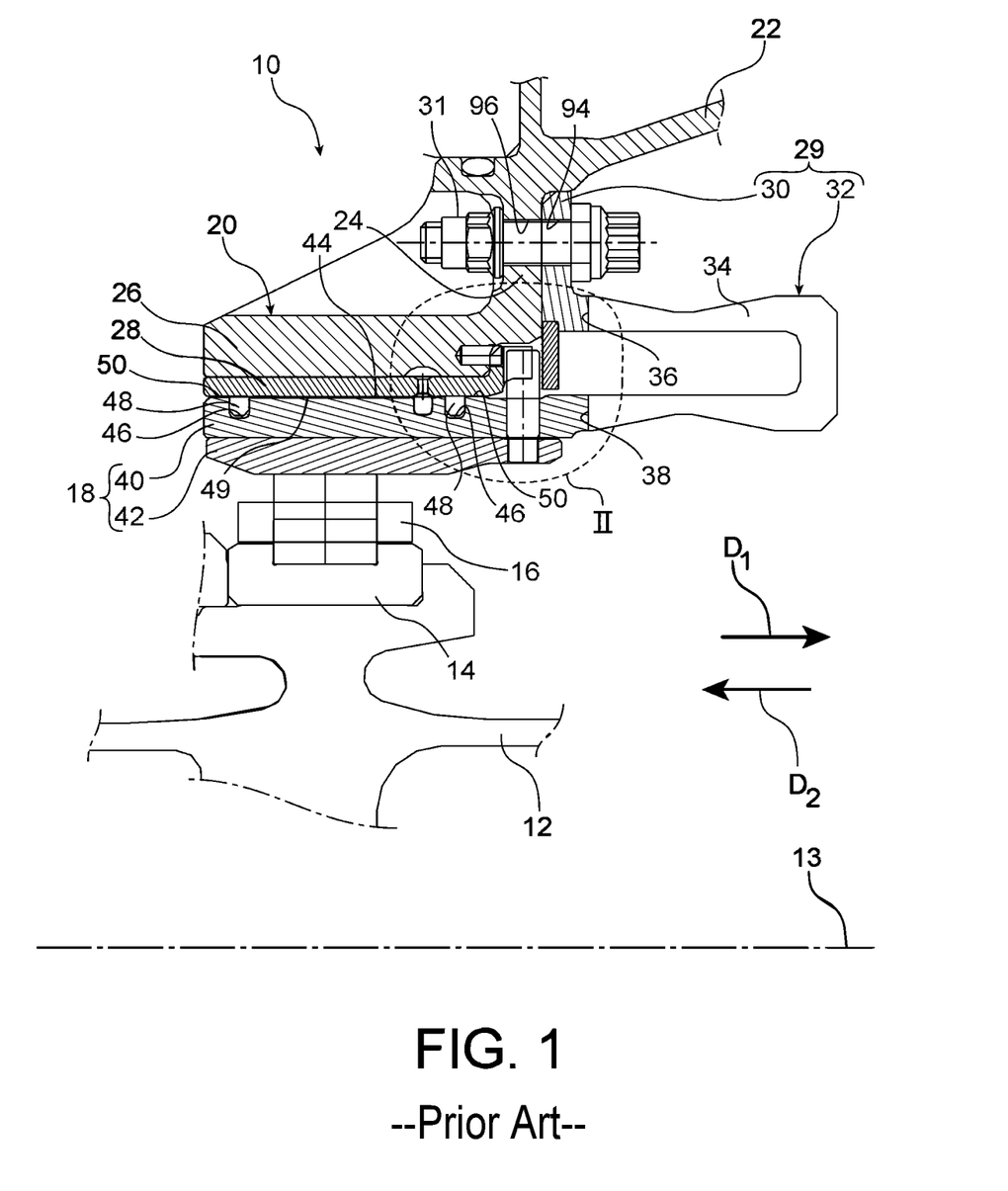
FIG. 1 is a half-axial cross-section schematic view of an example of device for centring and rotatably guiding a shaft of a turbomachine, according to prior art.
Figure 2:
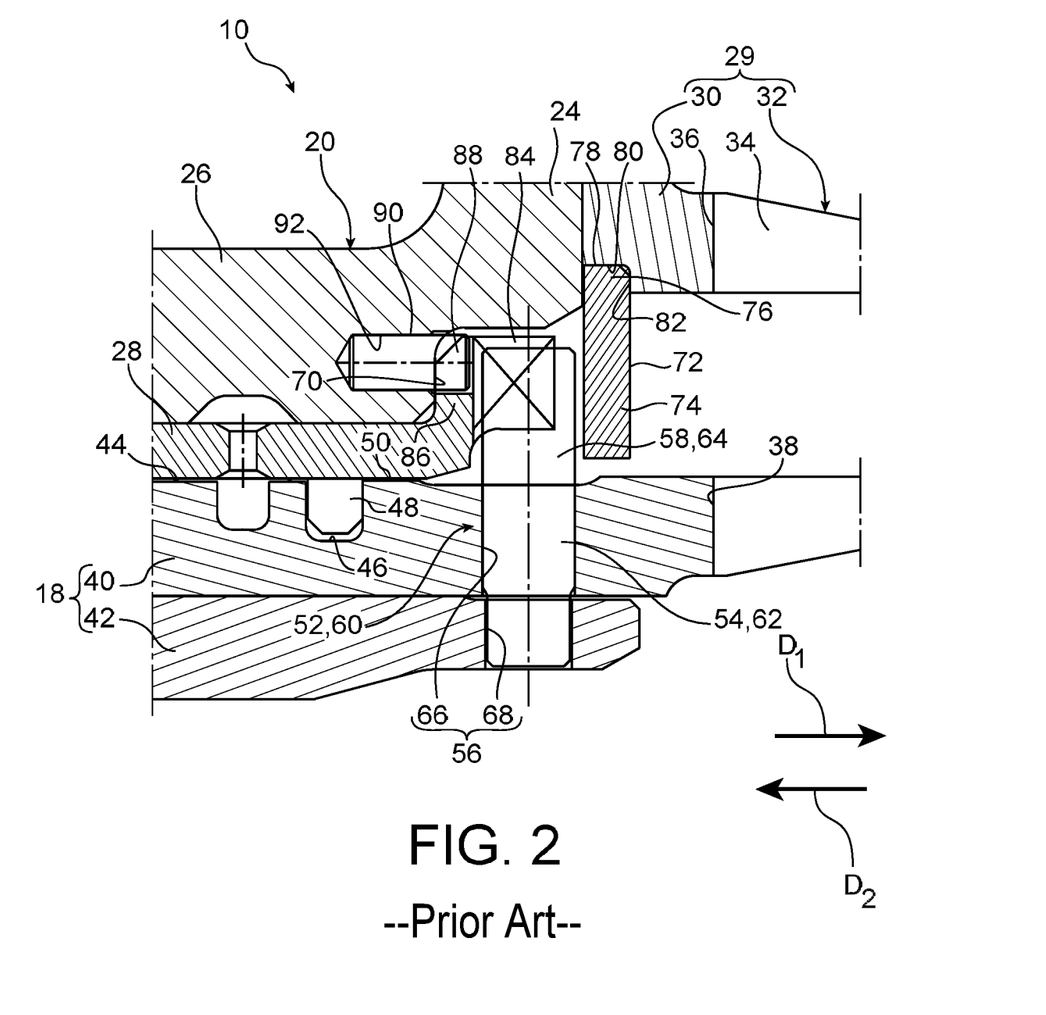
FIG. 2 is a view at a greater scale of the detail II of FIG. 1.
Figure 3:
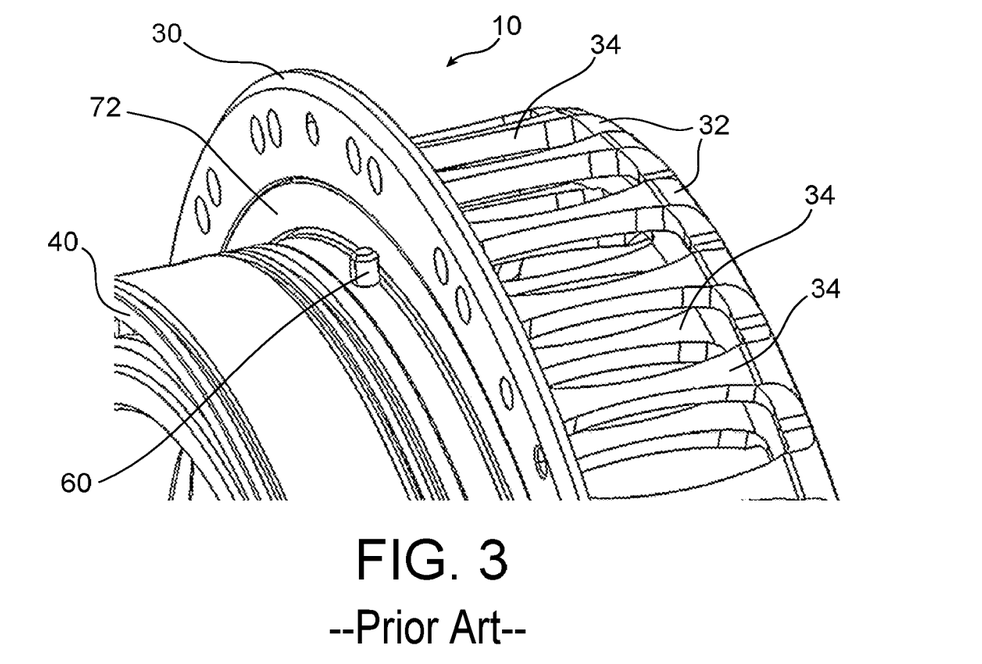
FIG. 3 illustrates, partially and in perspective, another example of device for centring and rotatably guiding a shaft of a turbomachine, according to prior art, including two annular rows of tabs.

One of these known solutions is illustrated in reference to FIGS. 1, 2 and 3, representing a part of a device 10 for centring and rotatably guiding a shaft 12 in a turbomachine with an axis of revolution 13.

This device 10 comprises a bearing formed by an inner ring 14 integral with the shaft 12, a rolling bearing 16, and an outer ring 18 integral with a generally annular shaped bearing support 20. This bearing support 20 includes a frustro-conical wall 22 for being connected to a casing of the turbomachine or to another bearing support coaxially extending to the shaft 12, an annular clamp 24 extending radially inwardly from an upstream end of the frustro-conical wall 22, and a revolution cylinder upstream part 26 extending upstream from a radially inner end of the annular clamp 24. In addition, the device 10 includes a shrink ring 28 snugly fit into the upstream part 26 of the bearing support 20.

The device 10 further includes means 29 for connecting the outer ring 18 to the bearing support 20. These means include an annular fastening clamp 30 fastened, for example by means of bolts 31, to the annular clamp 24 of the bearing support, and elastically deformable means 32 consisting of an annular row, or alternatively two annular rows as represented in FIG. 3, of upstream open U-shaped tabs or "pillars" 34, forming an assembly of the type commonly called "flexible cage" or "squirrel cage". These tabs 34 have an upper upstream end 36 connected to the fastening clamp 30, and a lower upstream end 38 connected to the outer ring 18 of the bearing.

In this example, the outer ring 18 is formed by two coaxial parts, that is an annular support 40 connected to the lower upstream end 38 of the tabs 34, and a raceway 42 snugly fit into the annular support 40. Alternatively, the outer ring 18 can be made as a single piece.

The outer ring 18 has radially outer annular surface 44 with a generally cylindrical revolution shape, and provided with two grooves 46 in which two sealing annular segments 48 axially delimiting an annular space 49 for receiving an oil film are respectively housed. In the example illustrated, both grooves 46 are formed in the annular support 40 of the outer ring 18 and are disposed between two annular seatings 50 of the outer ring, commonly called "bearing seatings", at right angles with which the play between the outer ring 18 and the shrink ring 28 defines the radial stroke of the flexible bearing. This play is lower than the thickness of the oil film but enough to preserve the damping function thereof until the flexible bearing seats under radial load.

In this solution of axially retaining the outer ring 18 of the bearing with respect to the bearing support 20, the device 10 includes retention means for axially retaining the outer ring 18 in case of rupture of the elastically deformable means 32, in particular in case of rupture of one or more tabs 34, or even all the tabs 34, which are better visible in FIG. 2.

Thus, these retention means comprise first means 52 distinct from the shrink ring 28 and having a radially inner part 54 engaged in at least one recess 56 formed in the radially outer surface 44 of the outer ring 18, and a radially outer part 58 extending radially outwardly projecting in extension with respect to the radially outer surface 44 of the outer ring 18.

In this example, the first means 52 take the form of an annular row of retention pins 60 each having a radially inner part 62 snugly fit into the outer ring 18, and a radially outer part 64 projecting from the radially outer surface 44 of the outer ring 18. More precisely, the radially inner part 62 of each retention pin 60 extends through a corresponding port 66 of the annular support 40, and has a radially inner end inserted in a corresponding port 68 of the raceway 42. This enables the raceway 42 to be kept in place in the annular support 40 even in case of loosening between these two parts. Each port 68 of the raceway 42 has a cross-section diameter slightly smaller than the cross-section diameter of the corresponding port 66 of the annular support 40, and the radially inner part 62 of each retention pin 60 has a narrowed cross-section so as to block the retention pin 60 in the radially inward direction, to prevent the retention pin 60 from coming out of its housing in case of loosening between the retention pin 60 and the port 66, such that it does not risk damaging the rolling bearing.

The respective radially outer parts 64 of the retention pins 60 extend in an annular space delimited by a shoulder 70 formed at the base of the annular clamp 24 of the bearing support.

In this example, the retention means, forming an axial stop, further comprise a retention ring (or washer) 72 distinct from the shrink ring 28 and having a radially inner part 74 extending away from the outer ring 18 and forming a seating opposed to the axial displacement of the radially outer part 58 of the first means 52 upstream, and a radially outer part 76 axially interposed between the bearing support 20 and the fastening clamp 30. The retention pins 60 thus axially extend facing the radially inner part 74 of the retention ring 72.

Thus, it clearly appears that in case of rupture of the elastically deformable means 32, the fastening clamp 30 is opposed to an axial displacement of the radially outer part 58 of the first means 52 in a first direction D1, herein oriented downstream, whereas the annular clamp 24 of the bearing support 20 is opposed to an axial displacement of the radially outer part 58 of the first means 52 in a second direction D2 opposed to the first direction D1, herein oriented upstream. Of course, the aforementioned directions can be reversed thanks to a reversal of the configuration of the device 10.

In addition, in the example illustrated, the retention ring 72 has a radially outer end 78 snugly fitted into an annular housing 80 of the fastening clamp 30 axially delimited by an annular shoulder 82 of the fastening clamp opposed to an axial displacement of the retention ring 72 in said first direction D1, herein downstream.

Further, in this example, an annular row of studs 84 integral with the bearing support 20 can be arranged such that the radially outer part 64 of each of the retention pins 60 is positioned between two of the studs 84. In the example illustrated, the studs 84 form the end of an extension 86 downstream of the shrink ring 28. The cooperation of the studs 84 with the retention pins 60 thus enables the rotation of the outer ring 18 to be limited in case of rupture of the elastically deformable means 32.

In addition, the extension 86 of the shrink ring 28 includes at least one recess 88 cooperating with an indexing pin 90 snugly fitted into a port 92 formed in the shoulder 70 of the bearing support 20. The indexing pin 90 enables the angular position of the shrink ring 28, and thus of the studs 84, to be indexed with respect to the bearing support 20. Preferably, each indexing pin 90 is substantially aligned with one of the retention pins 60, which thus prevents it from coming out of its housing even in the case of loosening with the port 92, such that it does not damage the rolling bearing. In addition, the angular indexing of the pins 60 with respect to the bearing support 20 is ensured by the registering ports 94 (see FIG. 1) of the fastening clamp 30 belonging to the connection means 29 with ports 96 (see FIG. 1) of the annular clamp 24 belonging to the bearing support 20. Some of the ports 94 and 96 are for the passing bolts 31 whereas others of these ports are for passing lubricant feeding channels or ventilation channels, or even for cooperating with tools for facilitating the separation of the connection means 29 and the bearing support 20 upon disassembling the device 10.

In addition, FIG. 3 also illustrates, partially and in perspective, another example of the device 10 for centring and rotatably guiding a shaft 12 in a turbomachine, which includes two annular rows of upstream open U-shaped tabs 34. Making these tabs 34 on two levels imposes to create an axial stop, in particular through the retention ring 72, to maintain the rolling bearing function in case of rupture of these tabs 34 under extreme load.

This solution of prior art has however drawbacks. Indeed, to be able to make such an axial stop, it is necessary to insert the retention washer 72 snugly fit which will be integrated under the clamp 30 of the bearing. In addition, several holes have to be pierced and bored to be able to shrink the pins 60 which will be in contact with the retention washer 72 in case of rupture of the tabs 34.

Thus, the assembly of such an axial stop requires a particular and complex machining for the bearing consisting in: making an accurate boring to ensure shrinking of the retention washer 72; making accurate piercing and boring for implanting the pins 60, this machining being additionally made on finished parts, which includes a scrap risk and can introduce a poorly controlled quadric-lobal shape depending on the residual stress state of the ring 18 and the force fit of the pins 60.

In addition, the snug fit of the retention washer 72 has an influence on the outer diameter of the clamp 30. Under some conditions, it swells the diameter of the clamp. The flexibility of the retention washer 72 is thus a further component to be taken into account in the overall flexibility, thus in dispersions.

Further, the insertion of pins 60 on finished parts imposes on operators to take careful precautions not to damage the rolling bearing and pollute it, in particular because of a material pick-up risk upon inserting the pins 60.

SUMMARY

One purpose of the invention is thus to overcome at least partially the abovementioned needs and drawbacks related to the embodiments of prior art.

In particular, it aims at providing a simple, economical and efficient solution to at least part of these problems, by displacing of the axial stop function.

One object of the invention, according to one of its aspects, is a device for centring and rotatably guiding a shaft of a turbomachine, including:
 a rolling bearing comprising an outer ring,
 a bearing support surrounding the outer ring,
 a shrink ring interposed between the outer ring and the bearing support,
 connection means for connecting the outer ring to the bearing support, the connection means comprising an annular fastening clamp mounted to the bearing support and elastically deformable means linking the outer ring to the fastening clamp, comprising at least one annular row of upstream opened U-shaped tabs,
 retaining means for axially retaining the outer ring in case of rupture of said elastically deformable means,
 characterised in that the retaining means include at least one axial stop clamp extending on an angular sector about the axis of revolution of the outer ring, positioned downstream and in contact with the fastening clamp, said at least one axial stop clamp including at least one fastening hole cooperating with a port of the fastening clamp for fastening together the fastening clamp, the bearing support and said at least one axial stop clamp through at least one fastening member, said at least one axial stop clamp further comprising at least one axial holding stud radially extending to the axis of revolution of the outer ring between two successive tabs of the elastically deformable means.

Thanks to the invention, displacing the axial stop function downstream of the fastening clamp enables the geometric integrity of the bearing not to be modified any longer. The axisymmetry of the bearing is improved. Removing holes forming the housings for the pins of the solution of prior art previously described enables further machinings to be avoided downstream of the raceway and proximity effects with machinings for thermocouples to be removed in the case of an instrument bearing. Moreover, the first quadri-lobe shape risk of the raceway is removed, as well as the second quadri-lobe shape risk due to the shrink force fit of the pins is also removed in favour of the raceway circularity.

Further, machining the bearing is simplified and scrap risks are removed. The bearing cost is decreased.

In addition, the axial stop clamp according to the invention can be machined independently of the bearing at a lesser cost and it is not subject to bearing wear. The mass of the entire device is not impacted. Likewise, the placement of the axial stop clamp(s) does not interfere with the isostatism of the rolling bearing. This (these) axial stop clamp(s) can be maintained by the screws for fastening the bearing.

Further, removing the retention washer of the solution of prior art enables a dispersion on the radial flexibility of the system to be removed, hence the accuracy on the target value to be fulfilled according to the specifications is increased. Machining the bearing support is also simplified. The studs, or fingers, of the fastening clamp(s) can possibly be used as anti-rotation means. Finally, by adding one or more axial stop clamp(s), in particular three of them, fastened through bearing fastening screws, they completely release the rolling bearing from requirements related to the axial stop, which is not the primary role of a bearing.

The device according to the invention can further include one or more of the following characteristics taken alone or according to any technically possible combinations.

The device can in particular include a plurality of axial stop clamps distributed, evenly or not, on the fastening clamp about the axis of revolution of the outer ring, in particular at least three axial stop clamps.

Said at least one axial stop clamp can in particular include a plurality of studs, in particular at least two studs circumferentially spaced apart and oriented to the axis of revolution of the outer ring.

In addition, said at least one axial stop clamp can include a plurality of fastening holes, in particular at least two fastening holes circumferentially spaced apart and each located at a circumferential end of said at least one axial stop clamp.

Further, said at least one axial stop clamp can include a central portion, in particular located between two studs, recessed so as to decrease the mass of said at least one axial stop clamp.

Said at least one axial stop clamp can also include, at the recessed central portion, at least one ventilation hole, in particular a plurality of ventilation holes, for example at least four ventilation holes.

In addition, the radial end of said at least one stud, located between two successive tabs, can have one or more relief ground parts to avoid any collision risk.

Further, the play available between a stud and a tab adjacent to the stud can be higher than the radial displacement of the outer ring.

Advantageously, the elastically deformable means can comprise two annular rows of tabs.

Another object of the invention, according to another of its aspects, is a turbomachine, characterised in that it includes at least one device as defined previously.

BRIEF DESCRIPTION OF THE DRAWINGS

The invention will be better understood upon reading the following detailed description, of an example of a non-limiting implementation thereof, as well as upon examining the schematic and partial figures of the appended drawing, in which.

Throughout these figures, identical references can designate identical or analogous elements.

In addition, the different parts represented in the figures are not necessarily drawn to a uniform scale, to make the figures more readable.

DETAILED DESCRIPTION OF THE INVENTION

It is to be noted that, throughout the description, the directions "upstream" and "downstream" are defined with respect to a general gas flow direction parallel to an axis 13 of the shaft 12 corresponding to an axis of the turbomachine, and the radial "inwardly" and "outwardly" directions are defined with respect to the axis 13.

FIGS. 1 to 3 have already been described in the part relative to the state of prior art and to the technical context of the invention.

An example of device 10 for centring and rotatably guiding a shaft 12 of a turbomachine in accordance with the invention will now be described in reference to FIGS. 4 to 8. It is to be noted that the elements previously described in connection with FIGS. 1 to 3 in the part relative to prior art and to the technical context of the invention are not described again. Of course, except for the retention means specific to prior art comprising in particular a retention ring 72 and pins 60, all of the characteristics previously described in connection with FIGS. 1 to 3 can be incorporated to a device 10 in accordance with the invention.

Figure 4:
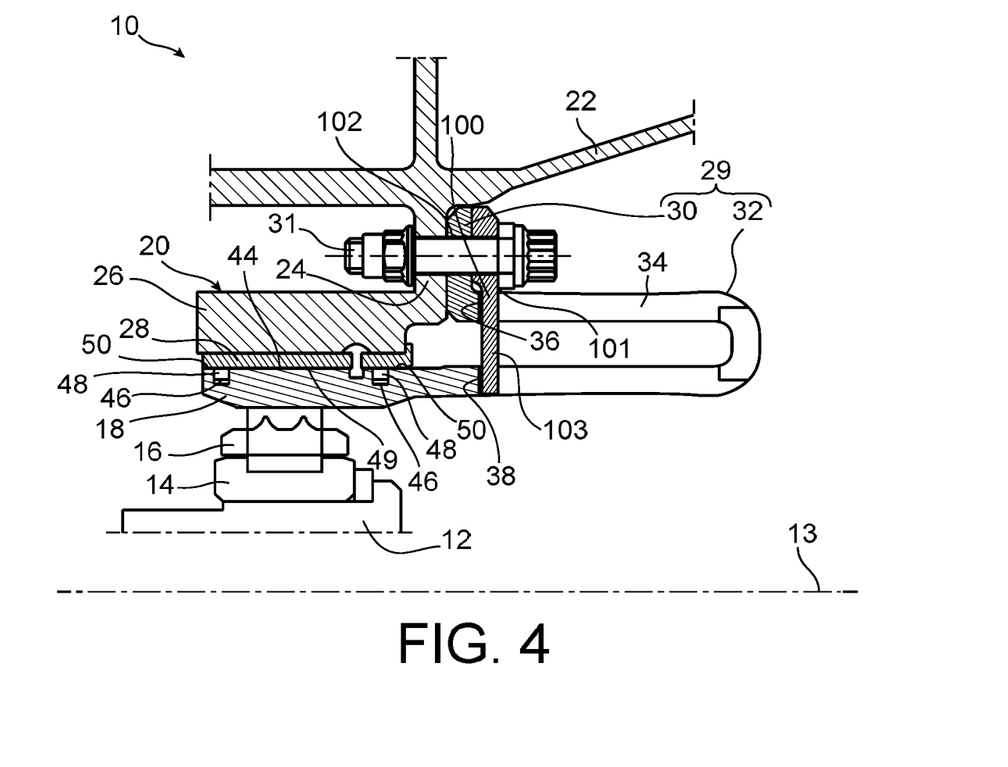
FIG. 4 is a half-axial cross-section schematic view of an example of device for centring and rotatably guiding a shaft of a turbomachine, according to the invention.

Thus, the device 10 includes a rolling bearing comprising an outer ring 18, a bearing support 20 surrounding the outer ring 18, a shrink ring 28 interposed between the outer ring 18 and the bearing support 20, and connection means 29 for connecting the outer ring 18 to the bearing support 20.

These connection means 29 comprise an annular fastening clamp 30 mounted to the bearing support 20 and elastically deformable means 32 linking the outer ring 18 to the fastening clamp 30, comprising at least one annular row of upstream open U-shaped tabs 34.

In addition, the device 10 includes retention means for axially retaining the outer ring 18 in case of rupture of the elastically deformable means 32.

Figure 7:
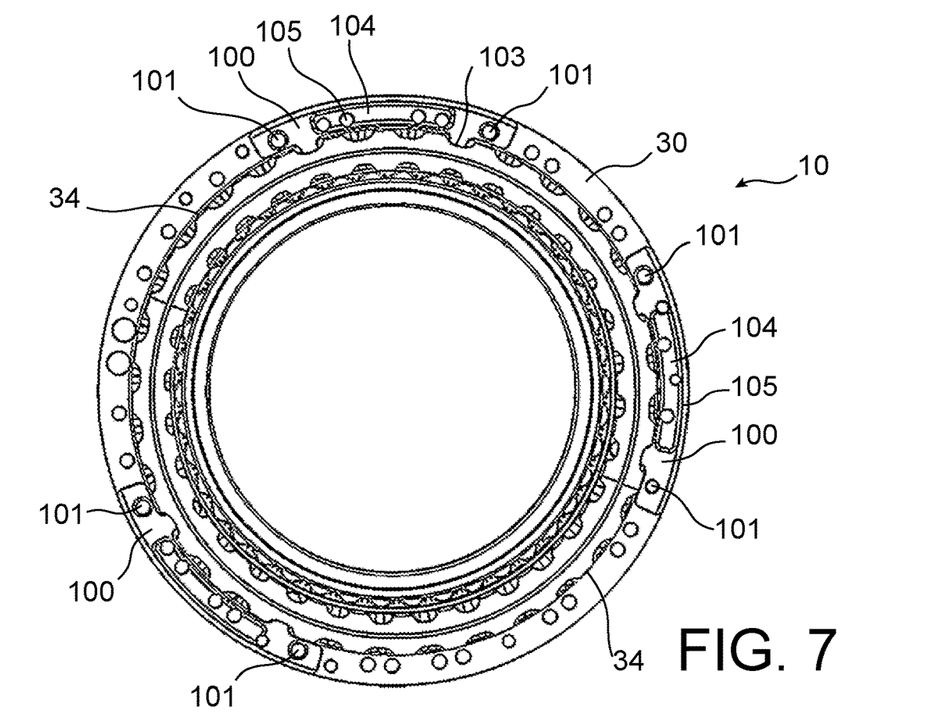
FIG. 7 represents, in a front face, the device of FIG. 5 comprising three axial stop clamps fastened to the fastening clamp of the device.

In accordance with the invention, these retention means include an axial stop clamp 100, here three axial stop clamps not evenly distributed about the axis of revolution 13 of the outer ring 18.

These axial stop clamps 100 each extend on an angular sector about the axis of revolution 13 of the outer ring 18.

They are positioned downstream and in contact with the fastening clamp 30. In addition, they each include fastening holes 101 cooperating with a port 102 of the fastening clamp 30 for fastening together the fastening clamp 30, the bearing support 20 and the axial stop clamp 100 through a fastening bolt 31.

Figure 6:
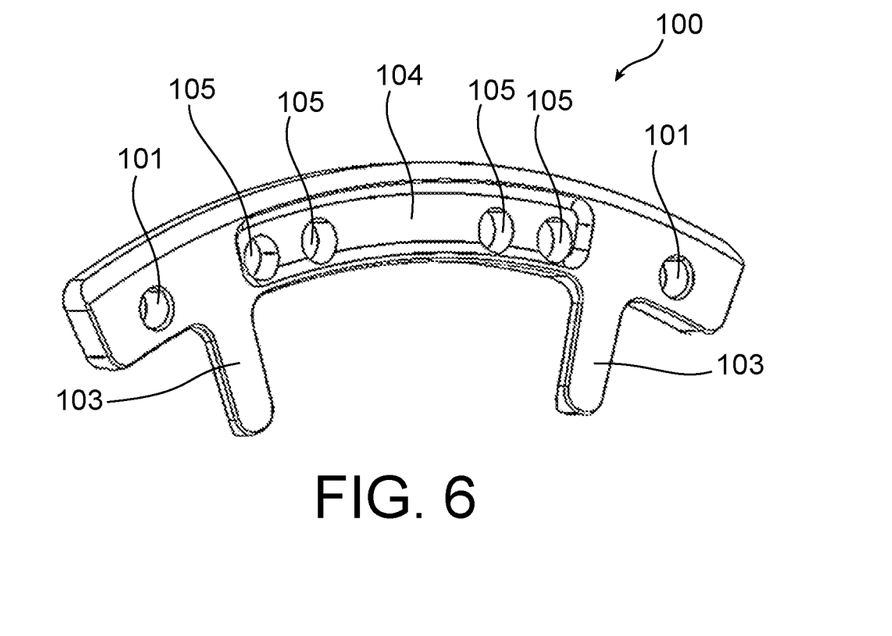
FIG. 6 illustrates, in an isolated way and in perspective, the axial stop clamp of FIG. 5.

More precisely, each axial stop clamp 100 includes two fastening holes 101 circumferentially spaced apart and each located at a circumferential end of the axial stop clamp 100, as is in particular visible in FIG. 6.

Figure 5:
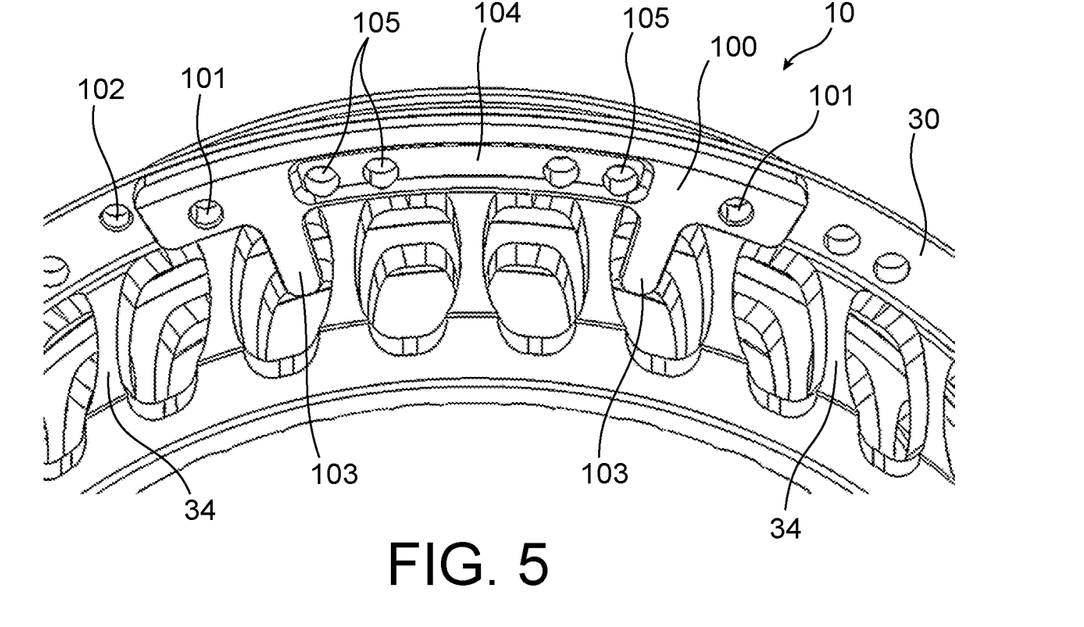
FIG. 5 illustrates, partially and in perspective, an example of axial stop clamp of a device according to the invention, fastened to the fastening clamp and comprising studs extending between the tabs of the device.

Further, each axial stop clamp 100 includes studs 103 (or fingers), here two studs 103 for each clamp 100, radially extending to the axis of revolution 13 of the outer ring 18 between two successive tabs 34 of the elastically deformable means 32, as is in particular visible in FIGS. 5 and 6.

Moreover, each axial stop clamp 100, as shown in particular in FIG. 6, includes a central portion 104 forming a lightening pocket, located between both studs 103, which is recessed in a non through way so as to decrease the mass of the axial stop clamp 100. At this recessed central portion 104, a plurality of ventilation holes 105, for example four ventilation holes 105 in this example, are formed.

Figure 8:
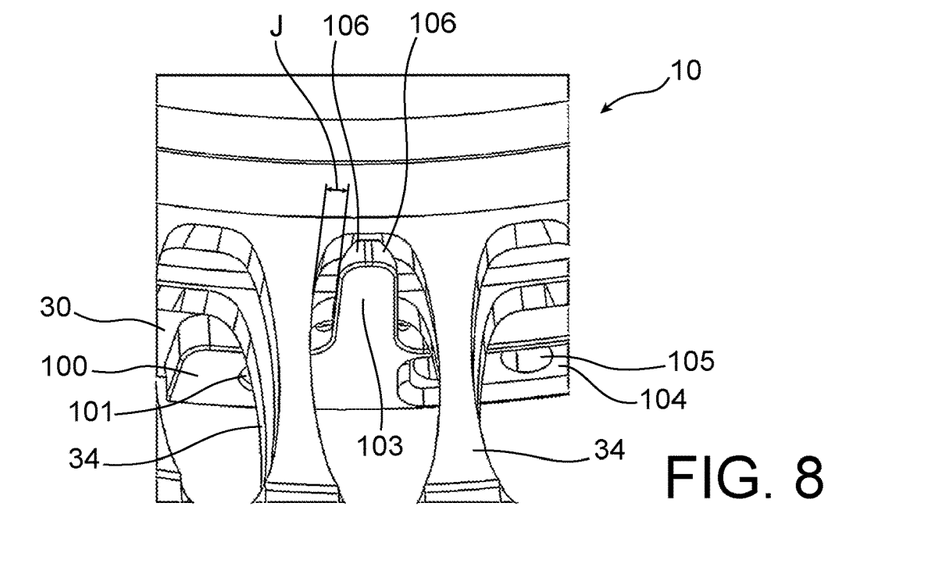
FIG. 8 is a partial perspective enlarged view of the device of FIG. 5 enabling the extent of the studs between the tabs of the device to be better viewed.

In addition, as is in particular visible in FIG. 8, the radial end of each stud 103, located between two successive tabs 34, has relief ground parts 106 made so as to avoid any collision risk.

It should be further noted that, as illustrated in FIG. 8, the play J available between a stud 103 and a tab 34 adjacent to the stud 103 is advantageously higher than the radial displacement of the outer ring 18 for absorption optimisation reasons.

Consequently, displacing of the axial stop function downstream of the fastening clamp 30, provided by the invention through the use of axial stop clamps 100, enables the operation of the bearing to be optimised and makes it possible to fulfil at least partly the problems previously raised in view of prior art.

Of course, the invention is not limited to the exemplary embodiment just described. Various modifications can be provided thereto by those skilled in the art.

The invention claimed is:

1. A device for centring and rotatably guiding a shaft of a turbomachine, comprising:
    a rolling bearing comprising an outer ring,
    a bearing support surrounding the outer ring,
    a shrink ring interposed between the outer ring and the bearing support,
    connection means for connecting the outer ring to the bearing support, the connection means comprising
        an annular fastening clamp mounted to the bearing support, and
        elastically deformable means linking the outer ring to the fastening clamp and comprising at least one annular row of upstream opened U-shaped tabs, and
    retaining means for axially retaining the outer ring in case of a rupture of said elastically deformable means, wherein
    the retaining means includes at least one axial stop clamp extending on an angular sector about an axis of revolution of the rolling bearing, positioned downstream of and in contact with the fastening clamp, and
    said at least one axial stop clamp includes
        at least one fastening hole cooperating with a port of the fastening clamp for fastening together the fastening clamp, the bearing support, and said at least one axial stop clamp with at least one fastening member, and
        at least one axial holding stud radially extending toward the axis of revolution of the rolling bearing between two successive tabs of the elastically deformable means.

2. The device according to claim 1, further comprising a plurality of axial stop clamps distributed on the fastening clamp about the axis of revolution of the rolling bearing.

3. The device according to claim 1, wherein said at least one axial stop clamp includes at least two axial holding studs circumferentially spaced apart and extending toward the axis of revolution of the rolling bearing.

4. The device according to claim 1, wherein said at least one axial stop clamp includes at least two fastening holes circumferentially spaced apart and each located at a circumferential end of said at least one axial stop clamp.

5. The device according to claim 1, wherein said at least one axial stop clamp includes a central portion recessed so as to decrease a mass of said at least one axial stop clamp.

6. The device according to claim 5, wherein said at least one axial stop clamp includes, at the recessed central portion, at least one ventilation hole.

7. The device according to claim 1, wherein a radial end of said at least one stud, located between two successive tabs, has one or more relief ground parts to avoid any collision risk.

8. The device according to claim 1, wherein a play available between a stud and a tab adjacent to the stud is higher than a radial displacement of the outer ring.

9. The device according to claim 1, wherein the elastically deformable means includes two annular rows of tabs.

10. A turbomachine, comprising at least one device according to claim 1.

* * * * *